US006760771B1

(12) United States Patent
Giroir et al.

(10) Patent No.: US 6,760,771 B1
(45) Date of Patent: Jul. 6, 2004

(54) METHOD AND SYSTEM FOR OPTIMALLY DISPATCHING INTERNETWORK TRAFFIC

(75) Inventors: Didier Giroir, Cagnes sur Mer (FR); Olivier Hericourt, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 09/690,616

(22) Filed: Oct. 17, 2000

(30) Foreign Application Priority Data

Oct. 21, 1999 (EP) .......................................... 99480099

(51) Int. Cl.$^7$ ...................... G06F 15/16; G06F 15/173; G06F 17/30
(52) U.S. Cl. ...................... 709/230; 709/223; 709/227; 707/10
(58) Field of Search ................................ 709/230, 200, 709/223, 224, 227, 228, 229; 707/10; 370/218, 235, 230; 713/154

(56) References Cited

U.S. PATENT DOCUMENTS

| | | | | |
|---|---|---|---|---|
| 5,828,653 A | * | 10/1998 | Goss | 370/230 |
| 5,951,694 A | * | 9/1999 | Choquier et al. | 714/15 |
| 6,006,264 A | * | 12/1999 | Colby et al. | 709/226 |
| 6,069,895 A | * | 5/2000 | Ayandeh | 370/399 |
| 6,081,524 A | * | 6/2000 | Chase et al. | 370/389 |
| 6,128,662 A | * | 10/2000 | Bolton et al. | 709/228 |
| 6,212,184 B1 | * | 4/2001 | Venkatachary et al. | 370/392 |
| 6,347,087 B1 | * | 2/2002 | Ganesh et al. | 370/392 |
| 6,373,845 B1 | * | 4/2002 | Aramaki et al. | 370/395.3 |
| 6,377,987 B1 | * | 4/2002 | Kracht | 709/220 |
| 6,389,462 B1 | * | 5/2002 | Cohen et al. | 709/218 |

OTHER PUBLICATIONS

Konish, S.J., Jr. "Layer 3 switching alternatives" Military Communications Conference, 1998. MILCOM 98. Proceedings., IEEE, vol.: 1, Oct. 18–21, 1998 pp.: 287–291 vol. 1.*

Harbaum et al. "Layer 4+ switching with QoS support for RTP and http" Global Telecommunications Conference, 1999. GLOBECOM '99, vol.: 2, 1999 pp.: 1591–1596 vol. 2.*

Jonathan Bransky and L. David Passmore. Retrieved "Layer 4 Switching" White Paper Sep. 1997 from http://penguin.cc.edu/network/L4_switching.html in Jan. 2004.*

Conover, Joel. Retrieved "Layer 4 Switching: Unraveling the 'Vendorspeak'" Article May 1999 from http://www.networkcomputing.com/shared/printArticle.jhtml?article=/1009/1009ws1full.html&pub=nwc in Jan. 2004.*

\* cited by examiner

Primary Examiner—Jack B. Harvey
Assistant Examiner—Tam T. Phan
(74) Attorney, Agent, or Firm—John R. Pivnichny; Dillon & Yudell LLP

(57) ABSTRACT

A method and system for delivering a datagram across multiple inter-network servers. The datagram is delivered from a source device having a first network level protocol to a destination device having a second network level protocol. The inter-network servers transport the datagram in accordance with a transport level protocol while the datagram has a transport priority defined by the first and second network level protocols. The source device delivers the datagram from a source port that designates the transport priority and the destination device receives the datagram at a destination port that also designates the transport priority. In accordance with the method of the present invention, either the source port or said destination port is first identified. The transport priority of said datagram is identified utilizing the transport priority designation of the identified source port or destination port. A current server capacity of each of the inter-network servers is determined. A server eligibility for each of the inter-network servers is determined in accordance with the determined current server capacity and the determined transport priority. Finally, the datagram is dispatched to one of the inter-network servers in accordance with the determined server eligibility.

24 Claims, 10 Drawing Sheets

Access to SNA Applications in TN3270 Environment

TN3270 Client and TN3270 Servers

General Physical View of an end User Accessing SNA Application via a TN3270 Server

TN3270 DT Dispatcher Tables

TN3270 DT Connection Table (611)

- Record (612)
  - Cx_Source_IP_Address (613)
  - Cx_Source_Port (614)
  - Cx_Dest_IP_Address (615)
  - Cx_Dest_Port (616)
  - Cx_Device_Type (617)
- Record (612)
- Record (612)
...

1

TN3270 Server DT Configuration Table (606)

- Record (607)
  - TN3270_Server_Identifier (608)
  - TN3270_Server_Capacity (609)
  - TN3270_Server_DT_List (610)
- (607)
- (607)
...

2

TN3270 DT Configuration Table (601)

- Record (602)
  - Device_Type (603)
  - TN3270_Traffic_Priority (604)
  - Discard_Eligible (605)
- (602)
- (602)
...

TN3270 Priority Finder Component

METHOD AND SYSTEM FOR OPTIMALLY DISPATCHING INTERNETWORK TRAFFIC

BACKGROUND OF THE INVENTION

1. Technical Field

The present invention relates to computer networks, and more particularly to a method and system in an Internet Protocol (IP) network for optimally dispatching IP telnet datagram traffic among multiple TN3270 Servers.

2. Description of the Related Art

SNA and IP Environment

Companies are increasingly interested in consolidating the multiple specialized networks that they operate or lease from service providers onto a single protocol network. These multiple specialized networks operate on diverse networking technologies such as Systems Network Architecture (SNA), Internet Protocol (IP) or Internetwork Packet Exchange (IPX). In making consolidation one of their top priorities, companies are almost exclusively selecting IP as their protocol of choice. For the overwhelming majority of these companies that are using SNA protocols and applications, however, there remains the need to maintain the ability to access the enormous quantity of existing corporate data that resides in traditional mainframes and only accessible through SNA applications.

Internet

The Internet is a global network of computers and computers networks (the "Net"). The Internet connects computers that use a variety of different operating systems or languages, including UNIX, DOS, Windows, Macintosh, and others. To facilitate and allow the communication among these various systems and languages, the Internet uses a language referred to as TCP/IP ("Transmission Control Protocol/Internet Protocol"). TCP/IP protocol supports three basic applications on the Internet:

(1) transmitting and receiving electronic mail, (2) logging into remote computers (the "Telnet"), and (3) transferring files and programs from one computer to another ("FTP" or "File Transfer Protocol").

TCP/IP

The Transmission Control Protocol/Internet Protocol (TCP/IP) protocol suite is used to establish an interconnection of networks that provide universal communication services: an internetwork, or internet. Each physical network has its own technology dependent communication interface (in the form of a programming interface) that provides basic communication functions between the physical network and the user applications. The architecture of the physical networks is hidden from the user. TCP/IP also provides interconnection between different physical networks to form what appears to the user to be one large network.

TCP is a transport layer protocol providing end-to-end data transfer and is responsible for providing a reliable exchange of information between networked computer systems. Multiple applications can be supported simultaneously over one TCP connection between two computer systems.

IP is an inter-network layer protocol hiding the physical network architecture bellow it. Part of the communicating messages between computers is a routing function that ensures that messages will be correctly directed within the network to be delivered to their destination. IP provides this routing function. An IP message is called an IP datagram.

Application Level protocols are utilized in addition to TCP/IP to transfer user and application data from a computer system to a destination computer system. Examples of such Application Level protocols include File Transfer Protocol (FTP), Telnet, Gopher, Hyper Text Transfer Protocol (HTTP).

IP Router

A "router" is a computer that interconnects two networks and forwards messages from one network to the other. Routers select the best transmission path between networks utilizing the IP layer of the TCP/IP protocol stack, such that any host (or computer) or workstation running TCP/IP over more than one interface could, in theory, forward messages between networks. Because IP implements basic routing functions, the term "IP router" is often used. However, dedicated network hardware routers can provide more sophisticated routing functions than the minimum functions implemented in IP.

World Wide Web

With the increasing size and complexity of the Internet, tools that are often called navigators or navigation systems have been developed to help find information on the network. Navigation systems include standards such as Archie, Gopher and, most well-known, the World Wide Web ("WWW" or "the Web"). In addition to serving as an Internet-based navigation system, the Web is also an information distribution and management system for the Internet. The Web provides an end user with a seamlessly integrated format of information, including still images, text, audio and video. A user on the Web using a graphical user interface may transparently communicate with different host computers on the system, different system applications, and different information formats for files and documents including text, sound, and graphics.

Telnet 3270

In an IP environment, telnet technologies (TN3270) is widely utilized to transport SNA information across an IP network. This technique for SNA "green screen" workstation users employs a Client/Server approach. IBM's "Host On Demand" or "WebClient" by CISCO are examples of client software implementations. Network Utility from IBM or CISCO router's offerings are typical Server implementations (hardware and software). The "TN3270 client" component usually runs within the customer's workstation while the "TN3270 server." component is usually placed in front of the customer's Data Center mainframes (or sometimes directly within the mainframe itself) or within the customer's branch offices. As illustrated in FIG. 1, IP protocols are used between a TN3270 server (102) and TN3270 clients (101), while traditional SNA protocols are used between TN3270 server (102) and target SNA Applications (103). The TN3270 client usually runs on an end user workstation.

Telnet 3270 Device Type

The characteristics of TN3270 data exchanged between TN3270 client and SNA application, depend on both the device on which the TN3270 client is located, and the SNA application. For instance, a device which is only capable of displaying information retrieved from the SNA application, is not capable of processing TN3270 print data. The characteristics of TN3270 data are partly identified by the Device Type (DEVICE-TYPE) parameter negotiated between the TN3270 client and the TN3270 server when the TN3270 connection is established. The possible values of this DEVICE-TYPE parameter are defined in the extension of the TN3270 protocol (TN3270E) described in the Request For Comments (RFCs) 2355, "TN3270 Enhancements" of the Internet Engineering Task Force (IETF). Typically, the DEVICE-TYPE indicates if the device is a display terminal or a printer.

Dispatcher System

When multiple TN3270 servers are used to gain access to SNA applications located within a SNA network, a dedicated device called a "dispatcher system" is often used within the TCP/IP network for dispatching the traffic to these multiple TN3270 servers. The main goal of the dispatcher system is to balance the load across the multiple TN3270. For instance, when a very powerful TN3270 server and a smaller TN3270 server are available, more traffic should be dispatched on the very powerful TN3270 server than on the smaller one. Such dispatcher systems are either dedicated hardware devices, or software components installed on existing network devices such as IP routers.

More detailed explanations of telnet, TN3270, and Network Utility, can be found in the following publications incorporated herewith by reference:

"TCP/IP Tutorial and Technical Overview" by Martin W. Murhammer, Orcun Atakan, Stefan Bretz, Larry R. Pugh, Kazunari Suzuki, David H. Wood, International Technical Support Organization, October 1998, GG24-3376-05.

"Internet in a nutshell" by Valerie Quercia, published by O'Reilly, October 1997.

"IBM 2216/Network Utility Host Channel Connection", Erol Lengerli, Jacinta Carbonell, Thomas Grueter; IBM International Technical Support Organization, January 1999, SG24-5303-00.

"IBM Network Utility Description and Configuration Scenarios", Tim Kearby, Peter Gayek, Gallus Schlegel, Imre Szabo, Zhi-Yong Zhang; IBM International Technical Support Organization, January 1999, SG24-5289-00.

"Internetworking with TCP/IP—Volume I—Principles, Protocols, and Architecture" Douglas E. Comer, Second Edition, Prentice Hall 1991.

Request For Comments (RFCs) from the Internet Engineering Task Force (IETF):

RFC 1576: TN3270 Current Practices,

RFC 1646: TN3270 Extensions for LU name and Printer Selection,

RFC 1647: TN3270 Enhancements,

RFC 2355: TN3270 Enhancements.

When multiple TN3270 servers are used within a TCP/IP network to access SNA applications located within a SNA network, an optimized system and method for dispatching and balancing TN3270 traffic across these multiple TN3270 servers must be provided.

The TN3270 protocol is a form of encapsulation of the data exchanged between the TN3270 client and the SNA application. TN3270 traffic (that is the TN3270 data comprised in the IP datagrams) can have different characteristics as explained hereinbelow.

TN3270 Interactive Traffic

TN3270 traffic is considered interactive insofar as it relates to menu driven SNA applications. This situation arises, for example,.when an end user displays a screen of information retrieved from a SNA application by a TN3270 client. This screen includes multiple options. According to an option selected by a user, a next screen is retrieved from the SNA application that is different from the screen on which the options are displayed. TN3270 interactive data should be processed at a high priority level within the TCP/IP network in order to provide the best possible interaction response time to an end user.

TN3270 Print Traffic TN3270 print traffic is TN3270 data delivered by a TN3270 client to SNA applications for print. By its nature, TN3270 print traffic is less sensitive to response time than interactive traffic.

Depending on TN3270 traffic characteristics (either interactive or print), the TN3270 traffic should be processed in accordance with different priority levels within a TCP/IP network. For example, IP datagrams comprising TN3270 interactive data should be treated with a higher priority than IP datagrams comprising TN3270print data. In this manner, a better response time will be provided to the interactive traffic.

In a TN3270 environment as described above, a problem arises in that the dispatcher system processes the different types of TN3270 traffic uniformly because the dispatcher does not recognize the characteristics of the TN3270 data within a given IP datagram. As a consequence, interactive traffic and print traffic are treated alike by the dispatcher system, thus frustrating the need to allocate different priority levels to interactive and print applications.

One possible solution to this problem is to dispatch TN3270 traffic based on either the IP address of the source computer system or on the IP address of the destination computer system. However, for a given origin or destination system, TN3270 traffic is processed at a uniform priority level. IP routers and dispatcher systems acknowledge one unique TN3270 traffic priority level without differentiating the characteristics of the TN3270 data. For example, an interactive connection and a batch print connection from the same source will be processed with the same priority. Thus, a high priority interactive connection may be slowed down by a low priority print connection.

An alternate solution is to dispatch TN3270 traffic according to the Type Of Service (TOS) field within the IP datagram header. The main drawbacks of this solution are as follows. First, the TOS field must be set in the IP datagrams that the dispatcher system receives from either the source workstation system (the system which creates the IP datagram with the TOS field), or by other network devices within the TCP/IP network (for instance an IP router which includes the functionality to alter the TOS field of an IP datagram it routes). Therefore, in an TCP/IP network in which the TOS field cannot be set or used, the dispatching of TN3270 traffic in accordance with the value of the TOS field is not possible. Another problem with dispatching in accordance with TOS, is that the TOS field of IP datagrams set: by workstations or devices within the TCP/IP network may be used for alternate purposes and may not reflect the actual priority and characteristics of TN3270 data comprised in the IP datagrams.

SUMMARY OF THE INVENTION

A method and system for delivering a datagram across multiple inter-network servers are disclosed herein. The datagram is delivered from a source device having a first network level protocol to a destination device having a second network level protocol. The inter-network servers transport the datagram in accordance with a transport level protocol while the datagram has a transport priority defined by the first and second network level protocols. The source device delivers the datagram from a source port that designates the transport priority and the destination device receives the datagram at a destination port that also designates the transport priority. In accordance with the method of the present invention, either the source port or said destination port is first identified. The transport priority of said datagram is identified utilizing the transport priority designation of the identified source port or destination port. A current server capacity of each of the inter-network servers is determined. A server eligibility for each of the inter-network servers is determined in accordance with the determined current server capacity and the determined transport priority. Finally, the datagram is dispatched to one of the inter-network servers in accordance with the determined server eligibility.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 6 depicts internal tables utilized by a TN3270 device type dispatcher in accordance with one embodiment of the present invention;

DETAILED DESCRIPTION OF THE PREFERRED EMBODIMENT

Access to SNA Applications

Figure 2:
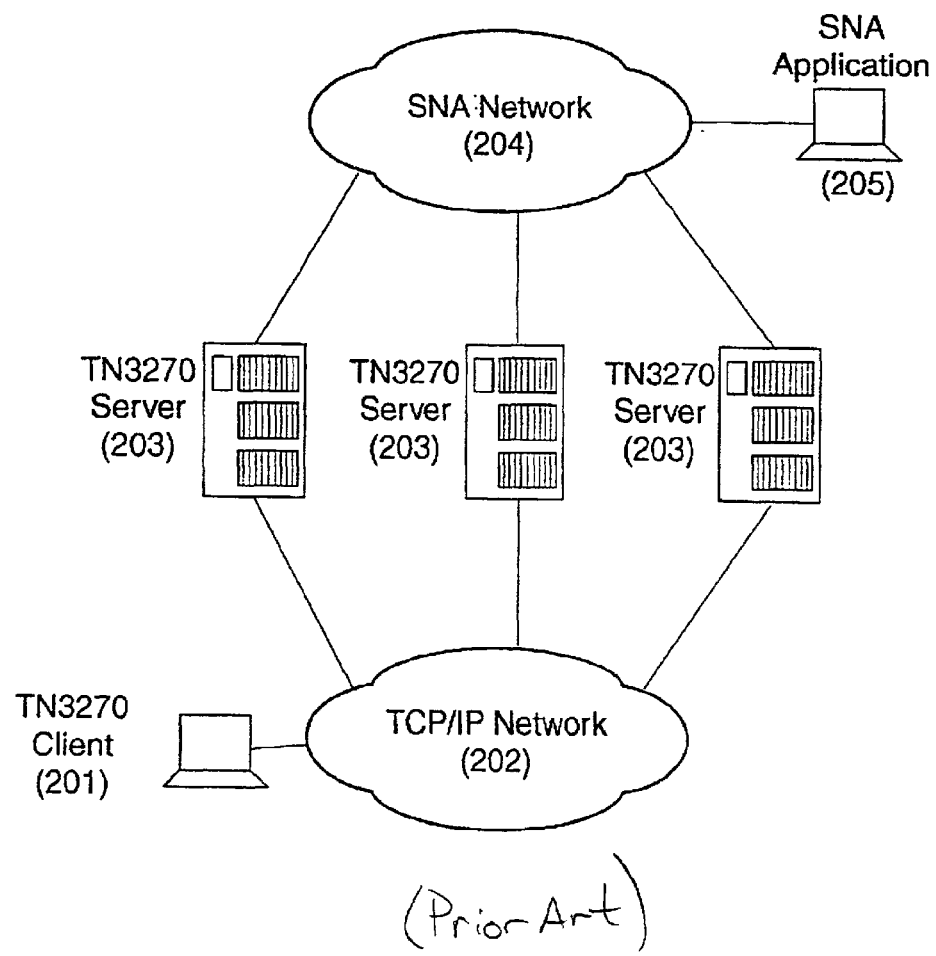
FIG. 2 is a pictorial view depicting conventional connectivity between a TN3270 client with multiple TN3270 servers and an SNA application.

FIG. 2 is a pictorial view depicting conventional connectivity between a TN3270 client with multiple TN3270 servers and an SNA application. As illustrated in FIG. 2, a TN3270 client 201 operates on a system (workstation) connected to an TCP/IP network 202. Multiple TN3270 servers 203 on TCP/IP network 202 connect the private TCP/IP network 202 to a (public) SNA network 204. A destination SNA application 205 is also connected to SNA network 204. It is important to note that TN3270 servers 203 connects two networks, and hence, act as intermediaries for communications between the two networks. Multiple TN3270 servers are often used in order to provide access robustness and load sharing.

IP Datagram

Figure 1:
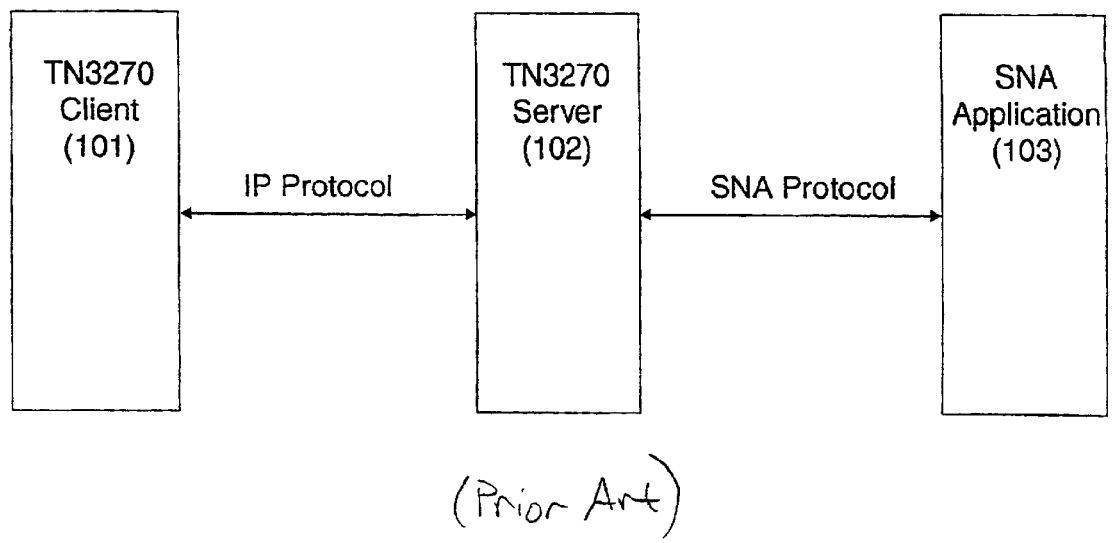
FIG. 1 is a block diagram illustrating conventional protocol connectivity between a TN3270 client and an SNA application in a TN3270 environment.
Figure 3:
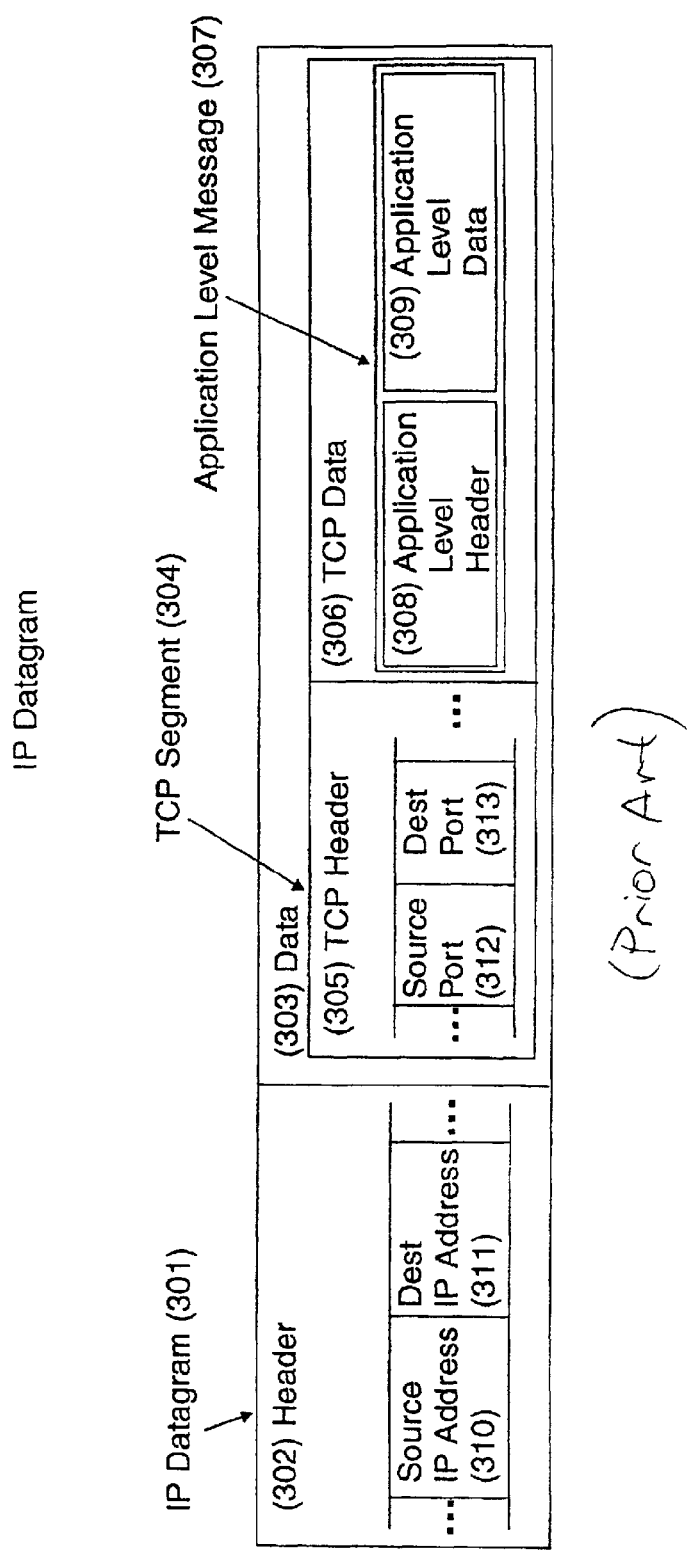
FIG. 3 illustrates a conventional IP datagram.

The transfer unit, or "data packet", in TCP/IP is referred to interchangeably herein as an "IP datagram". An IP datagram is made up of a header containing information for IP protocol processing, and data that is only relevant to higher level protocols. FIG. 3 depicts a format of a IP datagram as may be found in the environment described in FIGS. 1 and 2.

An IP datagram 301 is a message exchanged between computer systems across a TCP/IP network. As shown in FIG. 3, IP datagram 301 is divided into an IP datagram header 302, and IP datagram data 303. IP datagram header 302 comprises a source IP address field 310 and a destination IP address 311. Source IP address field 310 contains the IP address of the :computer (source device) which sends IP datagram 310. Destination IP address field 311 contains an IP address of the computer (destination device) to which IP datagram 311 is delivered. IP datagram data field 303 contains the data sent by the source to the destination computer system where the data is processed. Since the TCP/IP protocol suite is organized in layers, IP datagram data field 303 includes a message relevant to higher level protocols (TCP in the environments depicted herein). A TCP segment 304 embodies such a TCP message.

Within TCP segment 304 is a TCP header 305 that includes fields such as a source port 312 and the destination port 313 which identify the application protocol (e.g. HTTP, FTP, Telnet, TN3270) transported by TCP. This field is mainly used by the destination of the IP datagram to determine which application must process the data transported by TCP.

As depicted in FIG. 3, TCP segment 304 further includes a TCP data field 306 that contains application data 309 which is sent by the source to the destination computer system where the data is processed. TCP destination port field 313 contains the information relevant to the higher level Application level protocol such as HTTP, FTP, Telnet, and TN3270.

TCP destination port field 313 contains an Application Level message 307 that may be, for example, a TN3270 message, a HTTP message, a FTP message, or a Telnet message. Depending on the Application Level protocol, Application Level message 307 can also be divided into an Application Level header 308 and an Application Level destination port field 309. Application Level header 308 is the header relevant to the application protocol such as HTTP, FTP, Telnet, TN3270. Application Level destination port field 309 contains data which is processed by the application responsible of handling the Application Level protocol. Data within Application Level destination port field 309 is typically relevant to the end user (for instance, data entered by an end user on his workstation). For TN3270, this data is also referred to as TN3270 data stream.

TN3270 Client and TN3270 Server

Figure 4:
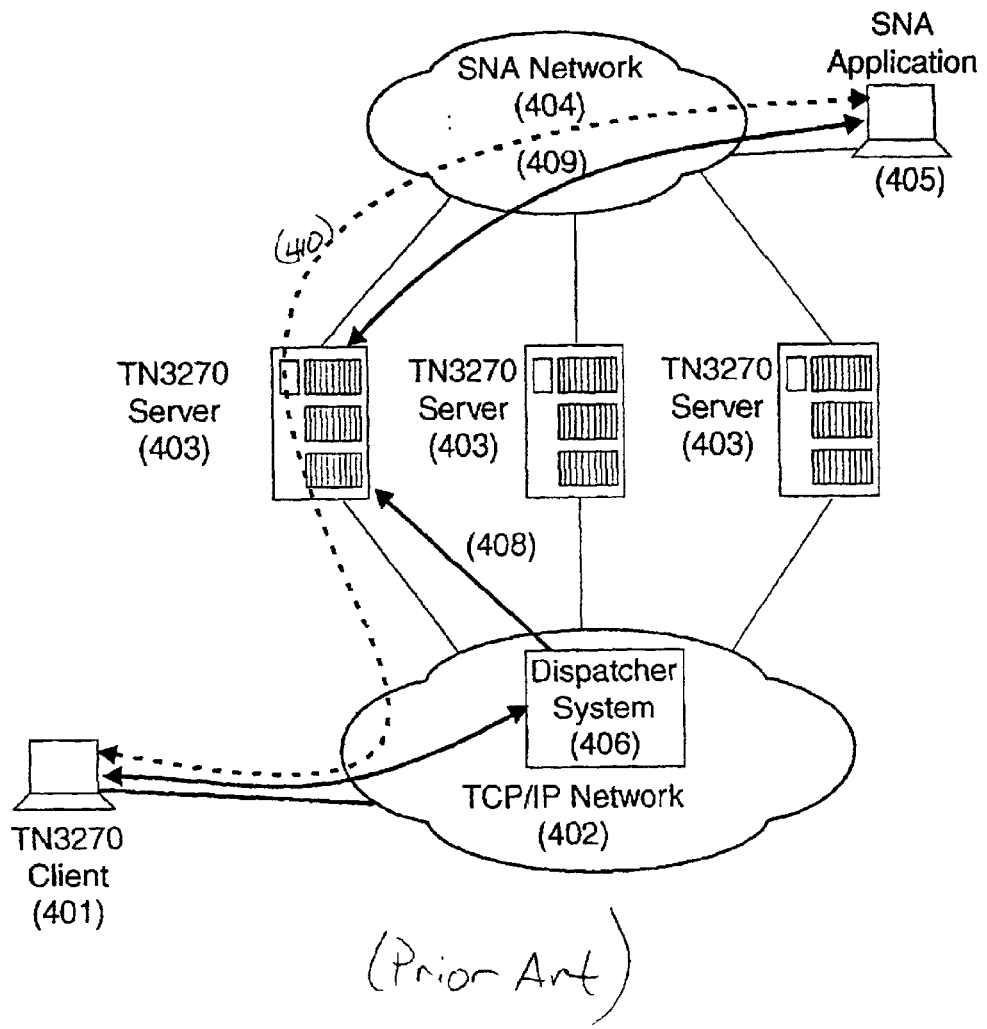
FIG. 4 is a pictorial view depicting a conventional access from a TN3270 client to an SNA application through a dispatcher system.

FIG. 4 shows a TN3270 client 401 operating on a device connected to a TCP/IP network 402. Multiple TN3270 servers 403 connect TCP/IP network 402 to a SNA network 404. A destination SNA application 405 is also connected to SNA network 404.

When multiple TN3270 servers 403 are used to access SNA applications within SNA network 404, a dispatcher system 406 provides load balancing across TN3270 servers 403. All of TN3270 servers 403 are accessed by TN3270 client 401 through dispatcher system 406 which operates as a virtual single TN3270 server. Dispatcher system 406 interacts with TN3270 client 4Q1 as a TN3270 server. In this regard, when TN3270 client 401 sends an IP datagram to TN3270 servers 403, dispatcher system 406 receives the datagram, selects the TN3270 server that provides the best service, and forwards the IP datagram to the selected TN3270 server. The TN3270 server receives the IP datagram and relays 409 the TN3270 data contained within the IP datagram towards the SNA application. A TN3270 connection between TN3270 client 401 and TN3270 server 403 is then established, thus providing communication between TN3270 client 401 and SNA application 405. Once TN3270 connection 410 is established between TN3270 client 401 and TN3270 server 403, and before any application data (the 3270 data stream) is exchanged between TN3270 client 401 and SNA application 405, the characteristics of the TN3270 traffic must be negotiated between the TN3270 client and the TN3270 server. This negotiation is prefaced by TN3270 client 401 and TN3270 server 403 agreeing to use the TN3270 enhancements (TN3270E), and includes negotiation of the device type information. The device type provides information regarding the device housing TN3270 client 401. The possible valid values of the device type are defined in the Request For Comments (RFCs) 2355 "TN3270 Enhancements" from the Internet Engineering Task Force (IETF), namely:

"IBM-3278-2", "IBM-3278-3", "IBM-3278-4", "IBM-3278-5" for terminals. Each value corresponds to a display size, from 24 rows×80 columns display to 27 rows×312 columns display;

"IBM-3278-2-E", "IBM-3278-3-E", "IBM-3278-4-E", "IBM-3278-5-E" for terminals supporting a subset of the 3270 extended data stream. Each value corresponds to a display size, from 24 rows×80 columns display to 27 rows×312 columns display;

"IBM-DYNAMIC", for terminals with no pre-defined display size; and

"IBM-3287-1" value for printers.

TN3270 Dispatcher System

Figure 5:
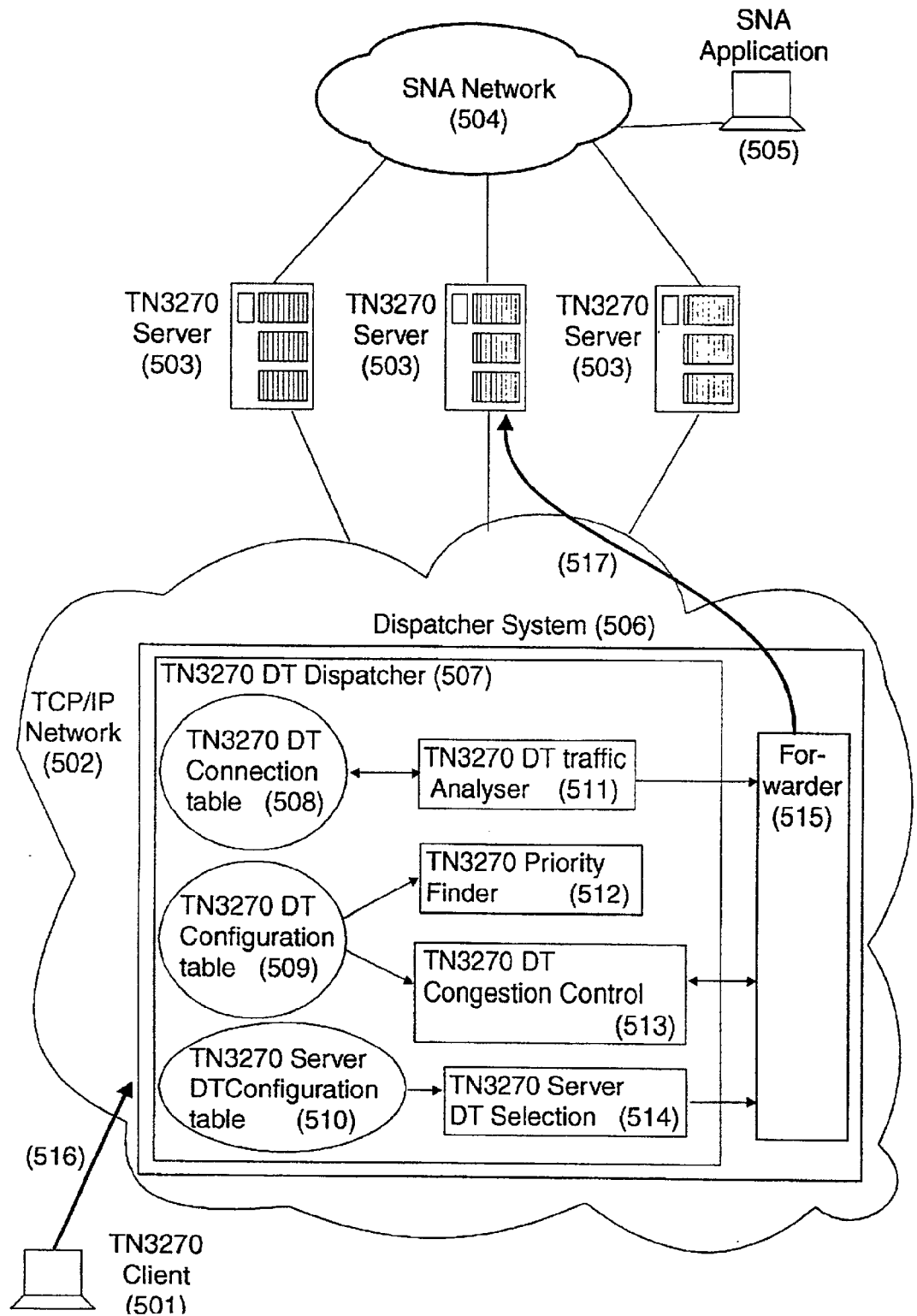
FIG. 5 illustrates a system for dispatching TN3270 traffic in accordance with one embodiment of the present invention.

The present invention relates to a system and method for selecting an optimum TN3270 server among multiple TN3270 servers according to a traffic priority level and TN3270 traffic characteristics criteria to improve availability and response time to end users accessing SNA applications from their workstations. FIG. 5 illustrates a system for dispatching TN3270 traffic on TN3270 servers 503 in accordance with one embodiment of the present invention.

As shown in FIG. 5, a TN3270 client 501 is connected to a TCP/IP network 502. Multiple TN3270 servers 503 are available for providing access to a SNA application 505 that is connected to a SNA network 504. A dispatcher system 506, located within TCP/IP network 502 is utilized for dispatching TN3270 traffic over TN3270 servers 503.

Before application data (the 3270 data stream) can be exchanged between TN3270 client 501 and SNA application 505, the characteristics of the TN3270 traffic must be negotiated between TN3270 client 501 and TN3270 server 503. These characteristics depend on both the device in which TN3270 client 501 is located and also on SNA application 505.

In accordance with the teachings of the present invention, TN3270 traffic characteristics are identified by means of the device type information negotiated between TN3270 client 501 and TN3270 server 503 after TN3270 client 501 and TN3270 server 503 have agreed that the TN3270 enhancements (TN3270E) can be used. The possible valid values of the device type are defined in the Request For Comments (RFCs) 2355 "TN3270 Enhancements" from the Internet Engineering Task Force (IETF). Typically, the TN3270 traffic is either "interactive" or "print":

TN3270 Interactive Traffic

Typically, one or more device type values are defined for network terminals ("IBM-3278-2" for example). Such devices (display terminals in this case) are usually only capable of displaying information retrieved from SNA applications. Such display terminals are not printers and do not handle print traffic.

TN3270 Print Traffic

Typically, one or more device type values are defined for printers ("IBM-3287-1"). Such devices (printers in this case) are usually only capable of printing information. Such printers are not display terminals and do not handle interactive traffic.

According to the present invention, the system and method for dispatching the TN3270 traffic uses the device type (DT) negotiated by the TN3270 client and the TN3270 server when the TN3270 connection is established. Therefore, the component that dispatches TN3270 traffic within dispatcher system 506 is referred to herein as "TN3270 DT dispatcher" 507. TN3270 DT dispatcher 507 is configured with information regarding TN3270 traffic 509 and TN3270 servers 510.

The IP datagram is sent 516 by the TN3270 client 501 to the dispatcher system 506. The IP datagram is then forwarded to the TN3270 DT dispatcher 507. The TN3270 DT dispatcher then forwards the datagram in sequence to its multiple components. A TN3270 DT traffic analyzer 511 analyzes the IP datagram and determines the device type by means of a TN3270 DT Connection table 611.

A TN3270 priority finder 512 determines the priority of the IP datagram, based on the device type and based on the characteristics of the traffic described in a TN3270 DT configuration table 601. A TN3270 DT congestion control component 513 detects any congestion condition on the dispatcher system, and, if required, discards traffic according to the device type and priority criteria.

A TN3270 server DT selection component 514 selects the optimal TN3270 server for forwarding the IP datagram, based on the characteristics of TN3270 servers described in a TN3270 server DT configuration table 606 and according to the transport priority and device type criteria.

The TN3270 DT dispatcher ultimately forward the IP datagram to a forwarder component 515 within dispatcher system 506. Forwarder component 515 forwards 517 the IP datagram to the selected TN3270 server. Current products offer an IP forwarder (such as the IP Routing component implemented in IP routers) or a dispatcher component (such as the TCP dispatcher component implemented in current dispatcher systems). It should be noted that the system and method of the present invention are independent of the forwarder component and do not rely on the manner in which the IP datagram is handled by this forwarder component which may utilize, for instance, forwarding mechanisms either based on the IP address or on the MAC (Medium Access Control) address of the TN3270server.

Internal Tables of the TN3270 DT Dispatcher

FIG. 6 depicts the different tables located on the dispatcher system 506. These tables are used by the various components of the TN3270 DT dispatcher for analyzing the TN3270 DT traffic; determining the transport priority; controlling the congestion; and, selecting the TN3270 server.

Two configuration tables are used by the TN3270 DT dispatcher TN3270—a DT configuration table TN3270 601 and a server DT configuration table 606. These two configuration tables should be created (by a network. administrator, for example) before initiating the TN3270 DT dispatcher.

TN3270 DT configuration table 601 comprises for each device type, a traffic priority and an indication concerning the discard eligibility of the traffic. TN3270 server DT configuration table 606 comprises for each TN3270 server, the capacity of this TN3270 server and a list of the device types that the TN3270 server can process.

In addition, a TN3270 DT Connection table 611 is dynamically built and utilized by the TN3270 DT dispatcher for internal purposes TN3270 server DT configuration table 611 comprises for each TN3270 connection, an identification of the connection and the device type associated with the connection. All three of these internal table are detailed in FIG. 6.

TN3270 DT Configuration Table

The TN3270 DT configuration table 601 (a flat file in a preferred embodiment) is created by the network administrator in charge of the TCP/IP network. TN3270 DT configuration table 601 associates each device type with a traffic priority and an indication concerning the discard eligibility of the traffic. The table contains a list of records 602, wherein each record includes a Device_Type field 603, a TN3270_Traffic Priority field 604, and a Discard_Eligible field 605.

There is one Device_Type 603 value for each type of device. Possible valid values of the device type are defined in the Request For Comments (RFCs) 2355 "TN3270 Enhancements" from the Internet Engineering Task Force (IETF) including the following:

- "IBM-3278-2", "IBM-3278-3", "IBM-3278-4", "IBM-3278-5" for terminals. Each value corresponds to a display size, from 24 rows×80 columns display to 27 rows×312 columns display;
- "IBM-3278-2-E", "IBM-3278-3-E", "IBM-3278-4-E", "IBM-3278-5-E" for terminals supporting a subset of the 3270 extended data stream. Each value corresponds to a display size, from 24 rows×80 columns display to 27 rows×312 columns display;
- "IBM-DYNAMIC", for terminals with no pre-defined display size; and
- "IBM-3287-1" value for printers.

Typically, one record in the table is defined for each one of these possible values.

TN3270_Traffic_Priority 604, is the transport priority of IP datagrams associated with the device type 603. Typically, the device type:"IBM-3287-1" (printer) is associated with low priority, while the device types for terminals (such as "IBM-3278-2") are associated with a high priority. Discard_Eligible 605 is an indication for discarding IP datagrams comprising TN3270 traffic. The information associated with the Device_Type 603 indicates whether IP datagrams can be discarded or not in case of congestion. The possible values as "Yes" and "No". In heavy congestion conditions, an IP datagram with Discard Eligible="Yes" is discarded first. An IP datagram with Discard_Eligibe="No" may also be discarded if required. Typically, the device type "IBM-3278-1" (printer) is defined with Discard Eligible= "Yes" and the device types for terminals (such as "IBM-3278-2") are defined with Discard_Eligible="No". Thus the print traffic is discarded first in case of congestion.

The TN3270 DT configuration table also comprises one default record with default values (TN3270_Traffic_Priority and Discard_Eligible default values). These default values are used when the Device Traffic (DT) value is not explicitly defined in a record of the table.

TN3270 Server DT Configuration

TN3270 server DT configuration 606 (a flat file in a preferred embodiment) is created by the network administrator in charge of the TCP/IP network. This table comprises for each TN3270 server 607, the capacity of the TN3270 server and a list of the device types that the TN3270 server can process. Each record 607 includes a TN3270 server_Identifier field 608, a TN3270_server_Capacity field 609, and a TN3270_server_Device_Type_List field 610.

TN3270_server_Identifier 608 is the address of the TN3270 server. This is for instance the IP Address or the MAC (Medium Access Control) address of the TN3270 server. TN3270_server_Capacity 609 is the capacity of the TN3270 server. Typically, a very powerful TN3270 server has a high capacity. For instance, more TN3270 traffic can be dispatched on a TN3270 server with a capacity of 15 than on a TN3270 server with a capacity of 0. High priority TN3270 traffic is preferably dispatched on high capacity TN3270 servers. TN3270_server_Device_Type_List 610 (also referred to as TN3270_server_DT_List) is a list of the device types that can be handled by the TN3270 server. For instance, a TN3270 server with a low capacity can be configured to only handle "IBM-3287-1" device type (printers), while a more powerful TN3270 server can be configured to handle all device types. A default value "ALL" indicates that the TN3270 server is capable of handling any device type.

TN3270 DT Connection Table

TN3270 DT connection table 611 is an internal table built and used by the TN3270 DT traffic analyzer component to store the identifier (both source and destination) and the device type of each TN3270 connection. The table contains a list of records 612, each record including a Cx_Source_IP_Address field 613, a Cx_Source_Port field 614, a Cx Dest_IP_Address field 615, a Cx_Dest_Port field 616, and a Cx_Device_Type field 617.

Cx_Source_IP_Address 613 is the IP address of the system which originates the TN3270 connection (this system is called "originator" or "source device"). Cx_Source_Port 614 is the number of the port identifying the program running on the source system and which originates the TN3270 connection (this program is also called the "source application"). The combination of. Cx_Source_IP_Address and Cx_Source_Port uniquely identifies the origin of a TN3270 connection.

Cx_Dest_IP_Address 615 is the IP address of the destination system of the TN3270 connection (this system is called "destination" or "destination device"). Cx_Dest_Port 616 is the number of the port identifying the program (the application) running on the destination device and which is the destination of the TN3270 connection (this program is also called the "destination application"). The combination of Cx_Source_IP_Address, Cx_Source_Port, Cx_Dest_IP Address, and Cx_Dest_Port uniquely identifies the TN3270 connection.

Cx-Device_Type 617 is the device type of the TN3270 connection identified by Cx_Source_IP Address 613, Cx_Source_Port 614, Cx_Dest_IP Address 615, and Cx_Dest_Port 616.

TN3270 DT Traffic Analyzer

Figure 7:
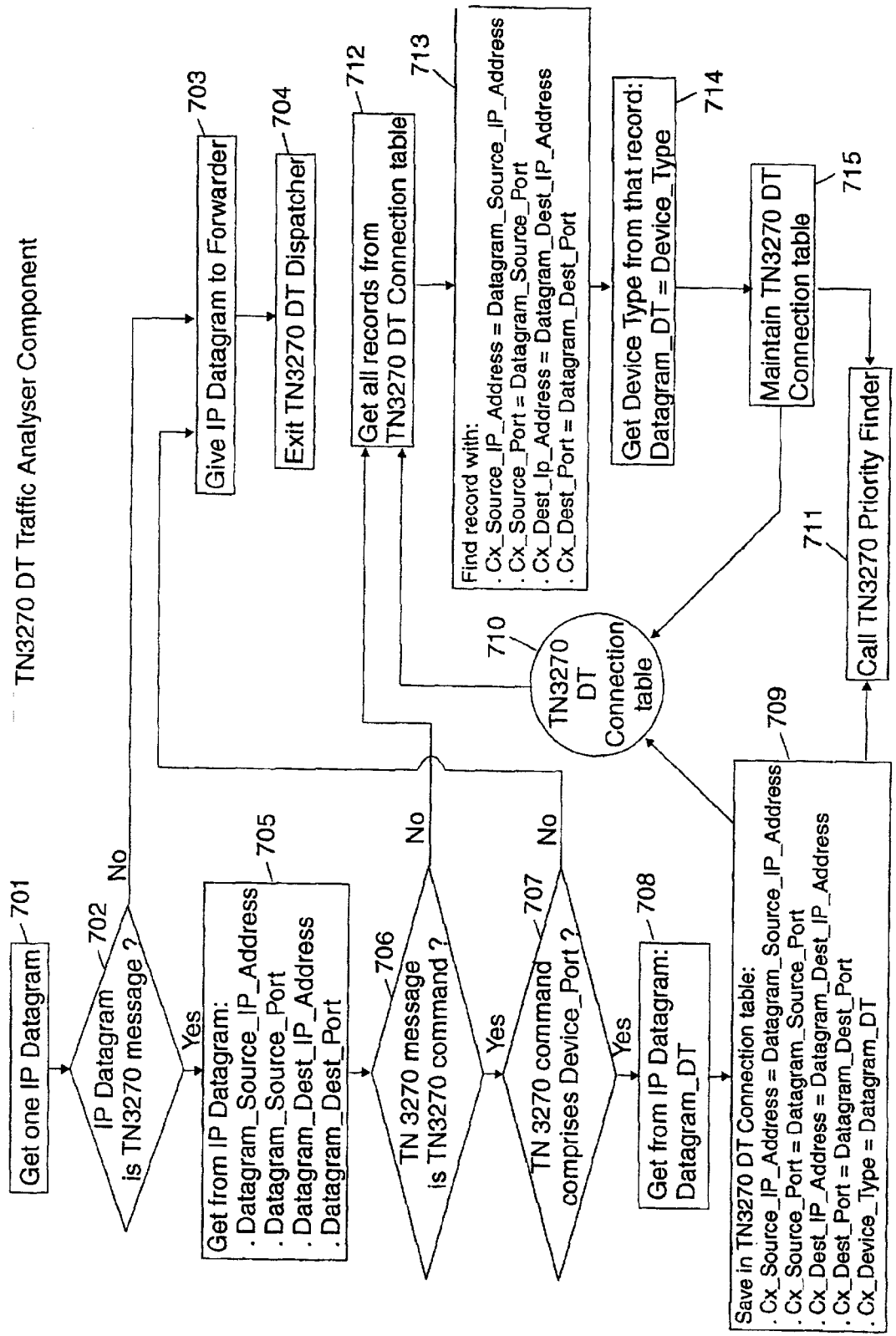
FIG. 7 is a flow diagram illustrating steps performed by a TN3270 device type traffic analyzer in the dispatcher system of the present invention.

The TN3270 DT traffic analyzer component of the TN3270 DT dispatcher is a program running on the dispatcher system. This component determined the device type of IP datagrams received by the dispatcher system. FIG. 7 is a flow diagram depicting the internal logic of the TN3270 DT traffic analyzer component.

As depicted at step 701 the TN3270 DT traffic analyzer retrieves an IP datagram. Next at step 702 the TN3270 DT traffic analyzer tests whether the IP datagram transports a TN3270 message or not. The test preferably uses the destination port field of the TCP header comprised in the destination port part of the IP datagram. The destination port is compared to the Port that uses the TN3270 protocol (by default, the Port used by TN3270 is 23). For instance, the port used by the TN3270 protocol can be a configuration parameter of the TN3270 DT dispatcher. If the destination port in the TCP header is equal to the Port used by TN3270, then the IP datagram transports a TN3270 message in the TCP destination port 306, otherwise the IP datagram does not transports a TN3270 message and does not need to be processed by the TN3270 DT dispatcher.

If the IP datagram does not transport a TN3270 message, and as depicted at step 703, the TN3270 DT dispatcher is not involved in the dispatching of non TN3270 traffic. The IP datagram is directly forwarded to the forwarder component of the dispatcher system. Proceeding to step 704, the processing by the TN3270 DT dispatcher of the IP datagram is completed. The TN3270 DT dispatcher waits for the next IP datagram.

If the IP datagram transports a TN3270 message, and as illustrated at step 705, the source and the destination of the IP datagram are identified from the IP header and TCP header as follows:

datagram_Source_IP_Address=source IP address field (in IP header);

datagram_Source_Port=source port field (in TCP header);

datagram_Dest_IP_Address=destination IP address field (in IP header); and datagram_Dest_Port=destination port field (in TCP header).

Step 706 depicts a test of whether or not the TN3270 message comprised in the IP datagram is a TN3270 command. TN3270 commands are preferably identified by the "Interpreted as Command" (IAC) leading character in the TN3270 message. If the TN3270 message is a TN3270 command, and as shown at step 707, a further test is performed for determining whether or not the TN3270 command comprises the device type information. The TN3270 command is preferably the "DEVICE-TYPE IS" command sent by the TN3270 server to the. TN3270 client during the subnegociation of the device type. Alternatively, said TN3270 command can the "DEVICE-TYPE REQUEST" command.

As illustrated at step 708, if the TN3270 command comprises the device type information the device type (DT) of the TN3270 connection is determined from the IP datagram (in the device type field of the TN3270 message) in accordance with datagram_DT device type (in TN3270 message). Step 709 depicts saving the information retrieved from the TN3270 message in a new record within the TN3270 DT connection table 710 as follows:

Cx_Source_IP_Address=datagram_Source_IP_Address;

Cx_Source_Port=datagram_Source_Port;

Cx_Dest_IP_Address=datagram_Dest_IP_Address;

Cx_Dest_Port=datagram_Dest_Port; and

Cx_Device_Type=datagram_DT.

Proceeding to step 711, the TN3270 priority finder component is called. If the TN3270 command does not include the device type information then, as shown at step 703 the IP datagram is neither a TN3270 message comprising device type information nor a TN3270 message comprising 3270 data stream (application data). As a result, the IP datagram is directly forwarded to the Forwarder component of the dispatcher system. In addition, the processing by the TN3270 DT dispatcher of the IP datagram is completed. The TN3270 DT dispatcher waits for the next IP datagram as illustrated at step 704.

If the TN3270 message is not a TN3270 command, the TN3270 message must include a 3270 data stream (application data). The IP datagram therefore belongs to a TN3270 connection which is already established and the device type has already been identified. This means that a TN3270 message comprising the device type information has already been received and the corresponding record has been created in the TN3270 DT connection table. The device type (DT) for that IP datagram is then retrieved as illustrated at steps 712 and 713 in which all records from the TN3270 DT connection table 710 are retrieved at step 712 and the record which corresponds to the TN3270 connection is found at step 713. This record is identified by the following four conditions:

Cx_Source_IP_Address=datagram_Source_IP_Address;

Cx_Source_Port=datagram_Source_Port;

Cx_Dest_IP_Address=datagram_Dest_IP_Address; and

Cx_Dest Port=datagram_Dest_Port.

As shown at step 714, the device type (DT) of the IP datagram is retrieved from that record in accordance with datagram_DT=Cx_Device Type.

Step 715 illustrates removal of closed TN3270 connections (terminated connections) from the TN3270 DT connection table 709 records. Closed TN3270 connections are detected for instance using the FIN and ACK indications in the TCP header. Optionally, a TN3270 connection is considered closed after a certain period of time without IP datagram on that TN3270 connection (this timer value can be for instance a configuration parameter of the TN3270 DT dispatcher). Any other existing algorithm to detect closed or half closed (for instance when one extremity of the connection has abnormally terminated) TCP connections can also be used to remove such connections from the table. Finally, as shown at step 711 the TN3270 priority finder component is called.

TN3270 Priority Finder

Figure 8:
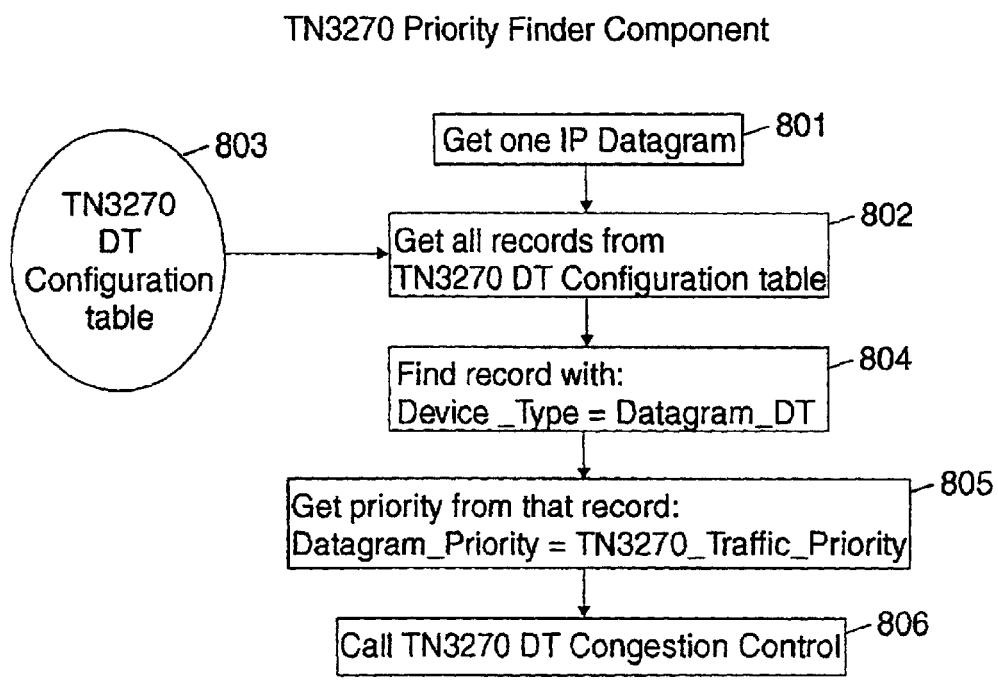
FIG. 8 is a flow diagram depicting steps performed by the TN3270 priority finder in the dispatcher system of the present invention.

The TN3270 priority finder component of the TN3270 DT dispatcher is a program running on the dispatcher system. This component determines the priority of the received IP datagram, based on its device type and based on the TN3270 DT configuration table. The FIG. 8 is a flow diagram illustrating the internal logic of the TN3270 priority finder component.

As illustrated in step 801 the TN3270 priority finder receives the IP datagram forwarded by the TN3270 DT traffic analyzer component (along with its datagram_DT). Next at step 802, the TN3270 priority finder retrieves all records from the TN3270 DT configuration table 803. This table is preferably read only once for all and cached by the TN3270 priority finder at configuration time, in order to minimize the impact on performances.

Proceeding to step 804 the TN3270 priority finder finds the record corresponding to the device type (DT) of the IP datagram. This record includes Device_Type=datagram_DT.

Step 805 shows the TN3270 priority finder determining from that record the priority of the IP datagram in accordance with datagram_Priority=TN3270_Traffic_Priority. Finally, step 806 illustrates the TN3270 priority finder calling the TN3270 DT congestion control component.

TN3270 DT Congestion Control

The TN3270 DT congestion control component of the TN3270 DT dispatcher is a program running on the dispatcher system. When the dispatcher system is congested, the TN3270 DT congestion control component determines the list of IP datagrams that are not yet sent and which must be discarded in accordance with the following criteria:

the device type of the IP datagram, as determined by the TN3270 DT Traffic analyzer component; and the transport priority of the IP datagram, as determined by the TN3270 priority finder component.

Figure 9:
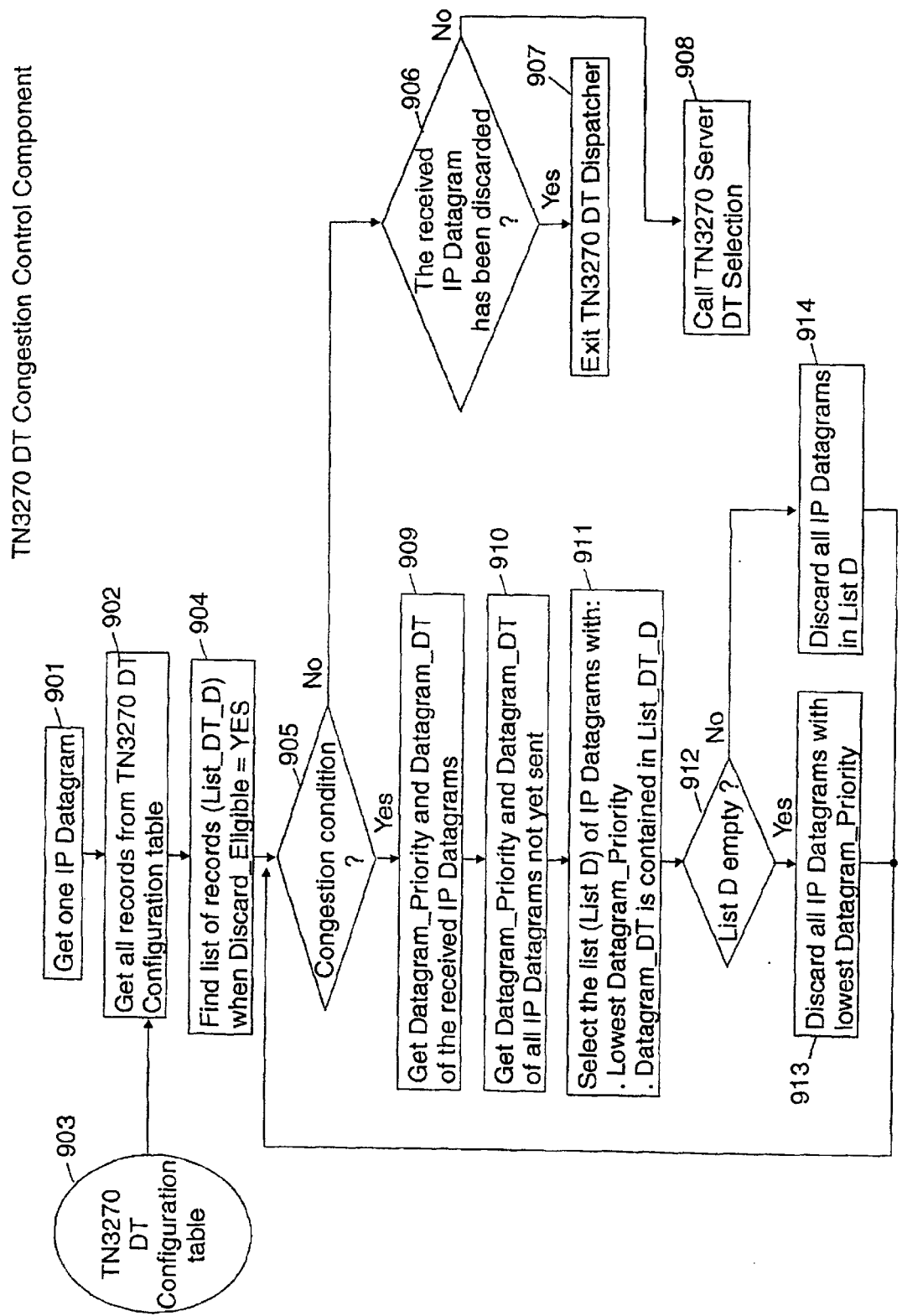
FIG. 9 is a flow diagram illustrating steps performed by the TN3270 device type congestion control component in the dispatcher system of the present invention.

FIG. 9 is a flow diagram depicting the internal logic of the TN3270 DT congestion control component. As illustrated at step 901, the TN3270 DT congestion control component obtains the IP datagram forwarded by the TN3270 DT traffic analyzer component (along with its datagram_DT which has been determined by the TN3270 DT traffic analyzer component, and the datagram_Priority which has been determined by the TN3270 priority finder component). Next, as shown at step 902, the TN3270 DT congestion control component retrieves all records from the TN3270 DT configuration table 903. This table is preferably read only once for all and cached by the TN3270 DT congestion control program when it starts, in order to minimize the impact on system performance.

Proceeding to step 904,the TN3270 DT congestion control component scans all records of the TN3270 DT configuration table to find all the records with Discard_Eligible="Yes". This list (called List_DT_D) comprises the device types which must be discarded first. As shown at step 905, the TN3270 DT congestion control component determines whether the dispatcher system is congested or not. This can be done for instance by interfacing the forwarder component and by checking whether the output queues are full or not.

If there is no congestion, and as depicted at step 906, the TN3270 DT congestion control component checks for whether the IP datagram received by the TN3270 DT congestion control has been discarded or not. If, as illustrated at step 908, the IP datagram has not been discarded, the TN3270 DT congestion control component forwards the IP datagram to the TN3270 server DT selection component. If, however, the IP datagram has been discarded, the TN3270 DT congestion control component exits the TN3270 DT dispatcher and waits for the next IP datagram to process as shown at step 907.

If congestion is detected, and as illustrated at step 909, the TN3270 DT congestion control component obtains the datagram_Priority and:the datagram_DT of the IP datagram received by the TN3270 DT congestion control component. Next, at step 910, the TN3270 DT congestion control component retrieves the datagram_Priority and the datagram_DT of all IP datagrams which have not yet been sent. For instance, all such IP datagrams can be found by interfacing the forwarder component and by checking all output queues. The datagram_Priority and the datagram_DT of each of these IP datagrams is preferably stored by the Forwarder along with the IP datagram, and can then be directly retrieved. If the datagram_Priority and the datagram_DT of each of these IP datagrams has not been stored, it can be determined using the TN3270 Traffic configuration table as already done by the TN3270 DT traffic analyzer and the TN3270 priority finder components.

Step 911 illustrates the TN3270 DT congestion control component selecting the list (ListD) of all IP datagrams with an device type which should be discarded first and with the lowest priority. This IP datagram must satisfy both of the following conditions:

datagram_DT is contained in List_DT_D; and the datagram is lowest datagram_Priority.

Step 912 illustrates the TN3270 DT congestion control component testing for whether or not ListD is empty. If ListD is not empty, and as depicted at step 914, the TN3270 DT congestion control component discards all. IP datagrams in ListD. IP datagrams which are not in ListD are not discarded the TN3270 DT congestion control component will attempt to deliver them in the following manner:

"IBM-3287-1" (printer) can be defined in the TN3270 DT configuration table with the lowest priority and Discard_Eligible="Yes";

"IBM-3278-2" (terminal) traffic can be defined with a high priority and Discard_Eligible="No"; and "IBM-3278-2-E" (terminal) traffic can be defined with a high priority and Discard_Eligible="Yes".

Thus, when congestion arises, the traffic with device type "IBM-3287-1" will be discarded first, then the traffic with device type "IBM-3278-2-E". The last one to be discarded (if still required) will be the traffic with device type "IBM-3278-2". Thus, the availability of the interactive service provided for the "IBM-3278-2" device type will be higher than the availability of the print service provided for the "IBM-3287-1" device.

After ListD has been discarded, the TN3270 DT congestion control loops to check if congestion remains as shown at step 905. The selection and discard steps are repeated until the congestion is eliminated.

As illustrated at step 913, if ListD is empty, the TN3270 DT congestion control component discards IP datagrams with the lowest datagram_Priority. The IP datagrams with the highest priorities can be sent. The TN3270 DT congestion control loops to check if congestion remains 905. The selection and discard steps are repeated until the congestion condition is eliminated.

TN3270 Server DT Selection

The TN3270 server DT selection component of the TN3270 DT dispatcher is a program running on the dispatcher system. The TN3270 server DT selection component selects a TN3270 server among the plurality of TN3270 servers to forward the IP,datagram. The TN3270 server is selected according to the following criteria:

the device type of the IP datagram, as determined by the TN3270 DT traffic analyzer component;

the transport priority of the IP datagram, as determined by the TN3270 priority finder component;

TN3270 server characteristics;

TN3270 server capacity; and

The list of device types compatible with the TN3270 server.

These criteria used by the TN3270 server DT selection component are fully compatible and can co-exist with other existing criteria such as TN3270 server dynamic load. Such additional selection criteria can be added to the criteria used by the present invention.

Figure 10:
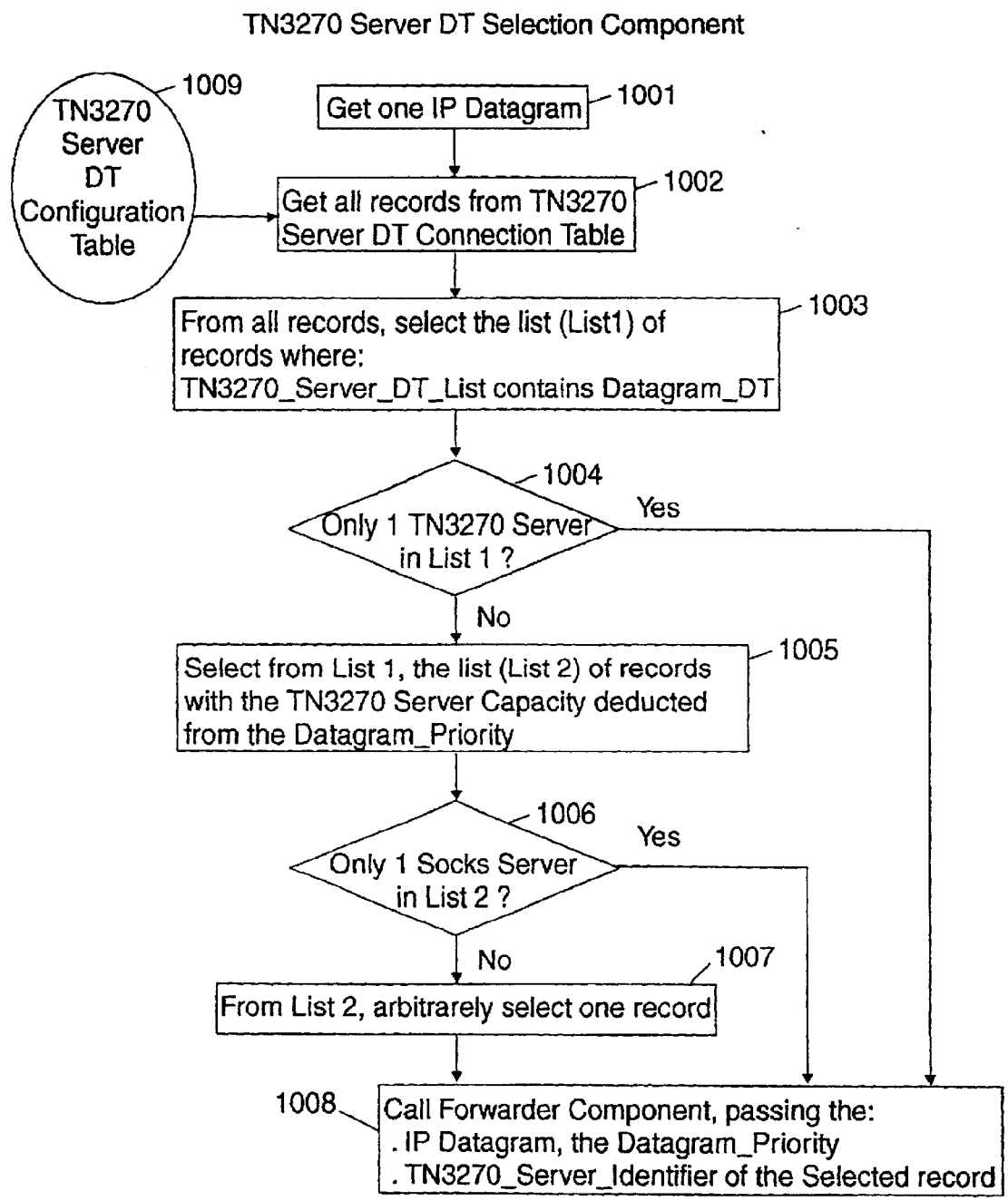
FIG. 10 is a flow diagram depicting steps performed by the TN3270 server DT selection component in the dispatcher system of the present invention.

FIG. 10 is a flow diagram illustrating the internal logic of the TN3270 server DT selection component. As depicted at step 1001, the TN3270 server DT selection component retrieves an,IP datagram forwarded by the TN3270 DT congestion control component.

Next, at step 1002, the TN3270 server DT selection component retrieves all records from the TN3270 server DT configuration table 1009. The table is preferably read only once for all and cached by the TN3270 server DT selection program when it starts, in order to minimize any impact on performances.

Proceeding at step 1003, the TN3270 server DT selection component scans all the records (TN3270 servers) in the TN3270 server DT configuration table to find all the TN3270 servers capable of handling the IP datagram (and which are then candidate for the TN3270 server selection). This TN3270 servers list (called List 1) is such that the TN3270 server DT List of each TN3270 server of the list comprises the datagram_DT (the device type of the received IP datagram, as determined by the TN3270 DT traffic analyzer).

Step 1004 illustrates the TN3270 server DT selection component testing the number of records in List 1. If no record is found, this means that no TN3270 server has been defined for that traffic, and therefore the IP datagram is discarded and the TN3270 DT dispatcher exits. If List 1 contains one record, the TN3270 server defined for this record is selected. The TN3270 server identifier is retrieved from this record.

As shown at step 1008, the TN3270 server DT selection component forwards the IP datagram to the forwarder component, with the TN3270 server identifier and the datagram_Priority. The forwarder then sends the IP datagram to the selected TN3270 server. The TN3270 DT dispatcher exits and waits for the next IP datagram.

If List 1 contains more than one record (TN3270server), this means that more than one TN3270 server can handle the IP datagram. Additional selection criteria must then be utilized.

Step 1005 depicts the TN3270 server DT selection component retrieving all records (TN3270 servers)from List 1 having a specific capacity 609. This specific capacity is determined using the datagram_Priority (priority of the IP datagram as determined by the TN3270 priority finder component). This second list of records (TN3270 servers) is called List 2. The relationship between capacity and priority can be defined for instance in a table accessed by the TN3270 server DT selection component. For instance, an IP datagram with a high datagram_Priority will be forwarded to a high capacity TN3270 server in order optimize the service provided to high priority TN3270 traffic.

As shown at step 1006,the TN3270 server DT selection component tests for the number of records in List 2. If List 2 contains one record, the TN3270 server defined for this record is selected. The TN3270_server_Identifier is extracted from this record.

Proceeding to step 1008, the TN3270 server DT selection component forwards the IP datagram to the forwarder component, with the TN3270 server Identifier. The forwarder then sends the IP datagram to the selected TN3270 server. The TN3270 DT dispatcher exits and waits for the next IP datagram. If List 2 contains more than one record, this means that more than one TN3270 server can handle the IP datagram. Final selection criteria must then be used.

Step 1007 illustrates the TN3270 server DT selection component selecting one record in List 2. This record is arbitrarily selected or is selected using any simple round robin algorithm (one record is selected this time, and next time a different one will be selected). The TN3270 server defined for this record is selected. The TN3270_server_Identifier is extracted from this record.

At step 1008, the TN3270 server DT selection component forwards the IP datagram to the forwarder component, with the TN3270_server_Identifier and the datagram_Priority. The forwarder then sends the IP datagram to the selected TN3270 server. The TN3270 DT dispatcher exits and waits for the next IP datagram.

ADVANTAGES

The present inventions provides the following advantages:

The integration of a priority criteria for dispatching TN3270 traffic improve the the access to SNA applications via TN3270 servers. For instance, a high priority TN3270 interactive traffic can be dispatched to a TN3270 server having a high capacity while a low priority TN3270 print traffic can be dispatched to a TN3270 server having a low capacity.

The integration of a TN3270 traffic characteristics criteria for dispatching TN3270 traffic allows the use of differently configured TN3270 servers (for capacity reason). For instance, a TN3270 server with a high capacity can be configured to process both interactive and print traffic, while a TN3270 server with a poor capacity can be configured to process only the print traffic. TN3270 traffic can then be dispatched to either one or another TN3270 server according to the TN3270 traffic characteristics.

The integration of a TN3270 traffic characteristics criteria for dispatching TN3270 traffic optimizes the performance of the mechanism for accessing to SNA applications via TN3270 servers. For instance, TN3270 interactive traffic can be dispatched to a high capacity TN3270 server while TN3270 print traffic can be dispatched to a low capacity TN3270 server.

Since the dispatching process does not use the Type Of Service (TOS) field of the IP datagram header, the invention can be used without being dependent of existing workstations or network devices within the TCP/IP network. For instance, the invention can be used to provide an optimized TN3270 dispatching within an existing TCP/IP network where the TOS field cannot be set nor used.

Since the dispatching process does not use the TOS field, the invention does not presume the possible values of the TOS field set by the workstation or network device within the TCP/IP network.

The Integration of a priority criteria for discarding TN3270 traffic in case of congestion contributes to the availability of SNA applications. A low priority TN3270 print traffic can be discarded by a congested dispatcher system. The high priority TN3270 interactive traffic can then be normally dispatched instead of being arbitrarily discarded. This process ensures a service continuity to this high priority interactive traffic.

The Integration of a TN3270 traffic characteristics criteria for discarding TN3270 traffic in case of congestion contributes to the availability of the SNA applications. For instance, a low priority TN3270 print traffic can be discarded by a congested dispatcher system. Interactive TN3270 traffic can then be normally dispatched instead of being arbitrarily discarded. This process ensures a service continuity to this TN3270 interactive traffic.

While the invention has been particularly shown and described with reference to a preferred embodiment, it will be understood that various changes in form and detail may be made therein without departing from the spirit, and scope of the invention.

What is claimed is:

1. A method for delivering a datagram across a plurality of inter-network servers from a source device having a first network level protocol to a destination device having a second network level protocol, said datagram includes a transport priority defined by said first and second network level protocols, said method comprising:

identifying either said source port or said destination port;

determining said transport priority of said datagram from a transport priority designation of said identified source port or from a transport priority designation of said identified destination port, wherein said determining further includes determining an inter-network connection from said source device to said destination device according to said identified source port or said identified destination port; and identifying said transport priority of said datagram from said determined inter-network connection;

determining a device type in accordance with an inter-network connection;

determining a current server capacity of each of said plurality of inter-network servers;

determining a server eligibility for each of said plurality of inter-network servers based on said determined current server capacity and said determined transport priority, wherein said determining further includes;
associating said device type with said inter-network connection in a first table;
associating said device type with one or more of said plurality of inter-network servers in a second table; and
selecting one of plurality of inter-network servers in reference to said second table; and
dispatching said datagram to one of said plurality of inter-network servers according to said determined server eligibility.

2. The method of claim 1, wherein said identifying said source port or said destination port further includes identifying a network level address of said source device.

3. The method of claim 1, wherein said identifying said source port or said destination port further includes identifying a network level address of said destination device.

4. The method of claim 1, wherein said method further includes determining said device type in reference to said first table.

5. The method of claim 1, wherein said method further includes determining said transport priority of said datagram in reference to a third table, wherein said third table associates a priority level with each device type.

6. The method of claim 4, wherein said plurality of inter-network servers are telnet 3270 servers that provide transport level connectivity between an internet protocol network in which said source device resides and a systems network architecture network in which said destination device resides, and wherein said determining said device type further includes
determining whether or not said datagram includes a telnet 3270 message incorporating said device type; and
in response to said datagram includes a telnet 3270 message incorporating said device type, updating said first table with a new telnet 3270 connection that is identified by an internet protocol address for said source device and an internet protocol address for said destination device.

7. The method of claim 6, wherein said method further includes
retrieving said device type from said datagram; and
associating said telnet 3270 connection with said retrieved device type within said first table.

8. The method of claim 1, wherein said determining said transport priority of said datagram is followed by discarding a datagram having a lowest transport priority from at least one of said inter-network servers that is congested.

9. An apparatus for delivering a datagram across a plurality of inter-network servers from a source device having a first network level protocol to a destination device having a second network level protocol, said datagram includes a transport priority defined by said first and second network level protocols, said apparatus comprising:
means for identifying either said source port or said destination port;
means for determining said transport priority of said datagram from a transport priority designation of said identified source port or from a transport priority designation of said identified destination port, wherein said determining further includes
means for determining an inter-network connection from said source device to said destination device according to said identified source port or said identified destination port; and
means for identifying said transport priority of said datagram from said determined inter-network connection;
means for determining a device type in accordance with an inter-network connection;
means for determining a current server capacity of each of said plurality of inter-network servers;
means for determining a server eligibility for each of said plurality of inter-network servers based on said .determined current server capacity and said determined transport priority, wherein said determining further include
means for determining a server eligibility for each of said plurality of inter-network servers based on said determined current server capacity and said determined transport priority, wherein said determining further include
means for associating said device type with said inter-network connection in a first table;
means for associating said device type with one or more of said plurality of inter-network servers in a second table; and
means for selecting one of plurality of inter-network servers in reference to said second table; and
means for dispatching said datagram to one of said plurality of inter-network servers according to said determined server eligibility.

10. The apparatus of claim 9, wherein said means for identifying said source port or said destination port further includes means for identifying a network level address of said source device.

11. The apparatus of claim 9, wherein said means for identifying said source port or said destination port further includes means for identifying a network level address of said destination device.

12. The apparatus of claim 9, wherein said apparatus further includes means for determining said device type in reference to said first table.

13. The apparatus of claim 12, wherein said plurality of inter-network servers are telnet 3270 servers that provide transport level connectivity between an internet protocol network in which said source device resides and a systems network architecture network in which said destination device resides, and wherein said means for determining said device type further includes
means for determining whether or not said datagram includes a telnet 3270 message incorporating said device type; and
in response to said datagram includes a telnet 3270 message incorporating said device type, means for updating said first table with a new telnet 3270 connection that is identified by an internet protocol address for said source device and an internet protocol address for said destination device.

14. The apparatus of claim 13, wherein said apparatus further includes
means for retrieving said device type from said datagram; and
means for associating said telnet 3270 connection with said retrieved device type within said first table.

15. The apparatus of claim 9, wherein said apparatus further includes means for determining said transport priority of said datagram in reference to a third table, wherein said third table associates a priority level with each device type.

16. The apparatus of claim 9, wherein said means for determining said transport priority of said datagram is followed by discarding a datagram having a lowest transport priority from at least one of said inter-network servers that is congested.

17. A computer program product for delivering a datagram across a plurality of inter-network servers from a source device having a first network level protocol to a destination device having a second network level protocol, said datagram includes a transport priority defined by said first and second network level protocols, said computer program product comprising:

program code means for identifying either said source port or said destination port;

program code means for determining said transport priority of said datagram from a transport priority designation of said identified source port or from a transport priority designation of said identified destination port, wherein said program code means for determining further includes program code means for determining an inter-network connection from said source device to said destination device according to said identified source port or said identified destination port; and program code means for identifying said transport priority of said datagram from said determined inter-network connection;

program code means, for determining a device type in accordance with an inter-network connection;

program code means for determining a current server capacity of each of said plurality of inter-network servers;

program code means for determining a server eligibility for each of said plurality of inter-network servers based on said determined current server capacity and said determined transport priority, wherein said determining further include program code means for associating said device type with said inter-network connection in a first table;

program code means for associating said device type with one or more of said plurality of inter-network servers in a second table; and program code means for dispatching said datagram to one of said plurality of inter-network servers according to said determined server eligibility.

18. The computer program product of claim 17, wherein said program code means for identifying said source port or said destination port further includes identifying a network level address of said source device.

19. The computer program product of claim 17, wherein said program code means for identifying said source port or said destination port further includes identifying a network level address of said destination device.

20. The computer program product of claim 17, wherein said computer program product further includes program code means for determining said device type in reference to said first table.

21. The computer program product of claim 17, wherein said computer program product further includes program code means for determining said transport priority of said datagram in reference to a third table, wherein said third table associates a priority level with each device type.

22. The computer program product of claim 21, wherein said plurality of inter-network servers are telnet 3270 servers that provide transport level connectivity between an internet protocol network in which said source device resides and a systems network architecture network in which said destination device resides, and wherein said program code means for determining said device type further includes program code means for determining whether or not said datagram includes a telnet 3270 message incorporating said device type; and in response to said datagram includes a telnet 3270 message incorporating said device type, program code means for updating said first table with a new telnet 3270 connection that is identified by an internet protocol address for said source device and an internet protocol address for said destination device.

23. The computer program product of claim 22, wherein said computer program product further includes program code means for retrieving said device type from said datagram; and program code means for associating said telnet 3270 connection with said retrieved device type within said first table.

24. The computer program product of claim 17, wherein said program code means for determining said transport priority of said datagram is followed by program code means for discarding a datagram having a lowest transport priority from at least one of said inter-network servers that is congested.

* * * * *